United States Patent [19]
Kreitzer

[11] Patent Number: 6,023,375
[45] Date of Patent: Feb. 8, 2000

[54] PROJECTION LENSES FOR USE WITH LARGE PIXELIZED PANELS

[75] Inventor: Melvyn H. Kreitzer, Cincinnati, Ohio

[73] Assignee: U.S. Precision Lens Inc., Cincinnati, Ohio

[21] Appl. No.: 08/908,115

[22] Filed: Aug. 11, 1997

Related U.S. Application Data

[60] Provisional application No. 60/024,083, Aug. 16, 1996, and provisional application No. 60/037,266, Jan. 31, 1997.

[51] Int. Cl.[7] .............................. G02B 13/18; G02B 9/60; G02B 9/62
[52] U.S. Cl. ......................... 359/649; 359/713; 359/714; 359/757; 359/764
[58] Field of Search .................................. 359/648, 649, 359/650, 651, 757, 764, 708, 713, 714

[56] References Cited

U.S. PATENT DOCUMENTS

| | | |
|---|---|---|
| 2,468,564 | 4/1949 | Luneburg . |
| 4,189,211 | 2/1980 | Taylor . |
| 4,425,028 | 1/1984 | Gagnon et al. . |
| 4,461,542 | 7/1984 | Gagnon . |
| 4,526,442 | 7/1985 | Betensky . |
| 4,548,480 | 10/1985 | Yamamoto et al. . |
| 4,564,269 | 1/1986 | Uehara . |
| 4,682,862 | 7/1987 | Moskovich . |
| 4,704,009 | 11/1987 | Yamamoto et al. . |
| 4,776,681 | 10/1988 | Moskovich . |
| 4,826,311 | 5/1989 | Ledebuhr . |
| 4,838,667 | 6/1989 | Ueda . |
| 4,900,139 | 2/1990 | Kreitzer . |
| 4,963,007 | 10/1990 | Moskovich ............................... 359/649 |
| 5,042,929 | 8/1991 | Tanaka et al. . |
| 5,179,473 | 1/1993 | Yano et al. . |
| 5,200,861 | 4/1993 | Moskovich . |
| 5,218,480 | 6/1993 | Moskovich . |
| 5,278,698 | 1/1994 | Iizuka et al. . |
| 5,309,283 | 5/1994 | Kreitzer . |
| 5,313,330 | 5/1994 | Betensky . |
| 5,329,363 | 7/1994 | Moskovich . |
| 5,331,462 | 7/1994 | Yano . |
| 5,353,161 | 10/1994 | Ono . |
| 5,442,484 | 8/1995 | Shikawa . |
| 5,455,713 | 10/1995 | Kreitzer . |
| 5,493,446 | 2/1996 | Nakajima . |
| 5,625,495 | 4/1997 | Moskovich . |
| 5,659,424 | 8/1997 | Osawa et al. . |
| 5,808,804 | 9/1998 | Moskovich ............................... 359/649 |
| 5,822,129 | 10/1998 | Sekine ..................................... 359/649 |

FOREIGN PATENT DOCUMENTS

| | | |
|---|---|---|
| 311116 | 12/1989 | European Pat. Off. . |
| 61-205909 | 12/1986 | Japan . |
| WO97/41461 | 11/1997 | WIPO . |

OTHER PUBLICATIONS

*The Handbook of Plastic Optics*, U.S. Precision Lens, Inc., Cincinnati, Ohio, 1983, pp. 17–29.

*Primary Examiner*—Scott J. Sugarman
*Attorney, Agent, or Firm*—Maurice M. Klee

[57] ABSTRACT

A projection lens for use with LCD panels is provided. The lens has a first lens unit which has a positive power and a second lens unit which has a negative power. The first lens unit contains at least four lens elements, namely, a positive first lens element, a negative second lens element which is composed of a high dispersion material, a third lens element of weak optical power, and a positive fourth lens element of strong optical power. The projection lens achieves a correction of chromatic aberration on the order of about a quarter of pixel for large LCD panels having pixels on the order of 200 microns.

21 Claims, 4 Drawing Sheets

6,023,375

PROJECTION LENSES FOR USE WITH LARGE PIXELIZED PANELS

CROSS REFERENCE TO RELATED PROVISIONAL APPLICATION

This application claims the benefit under 35 USC §119(e) of U.S. Provisional Applications Serial Nos. 60/024,083 filed Aug. 16, 1996 and 60/037,266 filed Jan. 31, 1997.

FIELD OF THE INVENTION

This invention relates to projection lenses and, in particular, to projection lenses which can be used, inter alia, to form an image of an object composed of pixels, e.g., a LCD.

BACKGROUND OF THE INVENTION

Projection lens systems (also referred to herein as "projection systems") are used to form an image of an object on a viewing screen. The basic structure of such a system is shown in FIG. 4, wherein 10 is a light source (e.g., a tungsten-halogen lamp), 12 is illumination optics which forms an image of the light source (hereinafter referred to as the "output" of the illumination system), 14 is the object which is to be projected (e.g., a LCD matrix of on and off pixels), and 13 is a projection lens, composed of multiple lens elements, which forms an enlarged image of object 14 on viewing screen 16. The system can also include a field lens, e.g., a Fresnel lens, in the vicinity of the pixelized panel to appropriately locate the exit pupil of the illumination system.

Projection lens systems in which the object is a pixelized panel are used in a variety of applications, including data display systems. Such projection lens systems preferably employ a single projection lens which forms an image of, for example, a single panel having red, green, and blue pixels.

Pixelized panels, specifically, LCD panels, come in various sizes depending upon the type of projection system in which they are to be used. Large LCD panels, e.g., panels having a diagonal of about 10.6 inches (about 270 millimeters), can be effectively employed in producing high resolution color images since such panels can have a high pixel count while still maintaining a pixel size which is large enough for reliable manufacture. In this regard, it should be noted that for a full color image from a single LCD panel, the number of pixels needed is three times that required for a monochrome image, thus making for small pixel sizes unless large LCD panels are used.

There exists a need in the art for a projection lens for use with a large pixelized panel which simultaneously has at least the following properties: (1) a long focal length; (2) the ability to operate at various magnifications while maintaining an efficient coupling to the output of the illumination system and a high level of aberration correction; (3) a relatively small size, including a relatively small number of lens elements, a relatively small barrel length, and a relatively small maximum lens diameter; (4) a high level of color correction; (5) low distortion; and (6) low sensitivity to temperature changes.

For a large pixelized panel, the use of a long focal length allows the field of view of the projection lens to be maintained in a range which facilitates aberration correction, e.g., the semi field of view of the lens can be around 25°.

A projection lens which can efficiently operate at various magnifications is desirable since it allows the projection system to be used with screens of different sizes and halls of different dimensions without the need to change any of the components of the system. Only the object and image conjugates need to be changed which can be readily accomplished by moving the lens relative to the pixelized panel. The challenge, of course, is to provide efficient coupling to the output of the illumination system and a high level of aberration correction throughout the operative range of magnifications.

A relatively small projection lens is desirable from a cost, weight, and size point of view. Large numbers of lens elements and elements having large diameters consume more raw materials, weigh more, and are more expensive to build and mount. Long barrel lengths normally increase the overall size of the projection system, which again leads to increased cost and weight. Accordingly, a lens with a minimum number of relatively small lens elements, located relatively close to one another, is desired.

A high level of color correction is important because color aberrations can be easily seen in the image of a pixelized panel as a smudging of a pixel or, in extreme cases, the complete dropping of a pixel from the image. These problems are typically most severe at the edges of the field. In general terms, the color correction, as measured at the pixelized panel, should be better than about a pixel and, preferably, better than about a half a pixel to avoid these problems.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

It should be noted that color aberrations become more difficult to correct as the focal length of the projection lens increases. Thus, the first and fourth criteria discussed above, i.e., a long focal length and a high level of color correction, work against one another in arriving at a suitable lens design.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lenses of FIGS. 1–3 being designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. As described below, plastic elements can be used and temperature insensitivity still achieved provided the powers and locations of the plastic elements are properly chosen.

The projection lenses described below achieve all of the above requirements and can be successfully used in producing relatively low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Iizuka et al., U.S. Pat. No. 5,278,698, Betensky, U.S. Pat. No. 5,313,330, and Yano, U.S. Pat. No. 5,331,462.

Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with a pixelized panel which simultaneously have each of the six desired properties discussed above. This object is achieved by means of a projection lens which comprises in order from its image side to its object side (i.e., from its long conjugate side to its short conjugate side):

(A) a first lens unit having a positive power and comprising in order from the image side to the object side:
  (i) a positive lens element;
  (ii) a negative lens element;
  (iii) a lens element of weak power, e.g., a power which is less than about 50 percent of the overall power of the projection lens; and
  (iv) a positive lens element of strong power, e.g., a power which is at least about 150 percent of the overall power of the projection lens; and
(B) a second lens unit having a negative power.

In certain embodiments, the second lens unit is a singlet (see FIGS. 1 and 2), while in other embodiments, it comprises two lens elements, one having a positive power and the other a negative power (see FIG. 3).

The projection lenses of the invention are preferably designed using the location of the output of the illumination system as a pseudo-aperture stop/entrance pupil of the projection lens (see Betensky, U.S. Pat. No. 5,313,330, the relevant portions of which are incorporated herein by reference). In this way, efficient coupling is achieved between the light output of the illumination system and the projection lens.

In accordance with these embodiments, the invention provides a projection lens system which forms an image of an object and comprises:

(a) an illumination system comprising a light source and illumination optics which forms an image of the light source, said image being the output of the illumination system;

(b) a pixelized panel which comprises the object; and (c) a projection lens of the type described above, said projection lens having an entrance pupil whose location substantially corresponds to the location of the output of the illumination system.

In some embodiments of the invention, zooming of the projection lens system is achieved, by varying: (a) the distance between the projection lens and the pixelized panel; and (b) the distance between the first lens unit and the second lens unit. Zooming on the order of 5% can be achieved in this way. The lens system of FIG. 3 is of this type.

In other embodiments, focusing of the projection lens system is achieved by varying: (a) the distance between the projection lens and the pixelized panel: and (b) the distance between the first and second lens elements of the first lens unit. The lens systems of FIGS. 1 and 2 are of this type.

The projection lenses of the invention are also designed to be substantially athermal. As discussed fully below, this is done by balancing the powers of the plastic lens elements having substantial optical power. In this way, changes in the power of the positive lens elements caused by temperature changes are compensated for by changes in the power of the negative lens elements, thus providing substantially constant overall optical properties for the projection lens as its temperature changes.

Figure 1A:
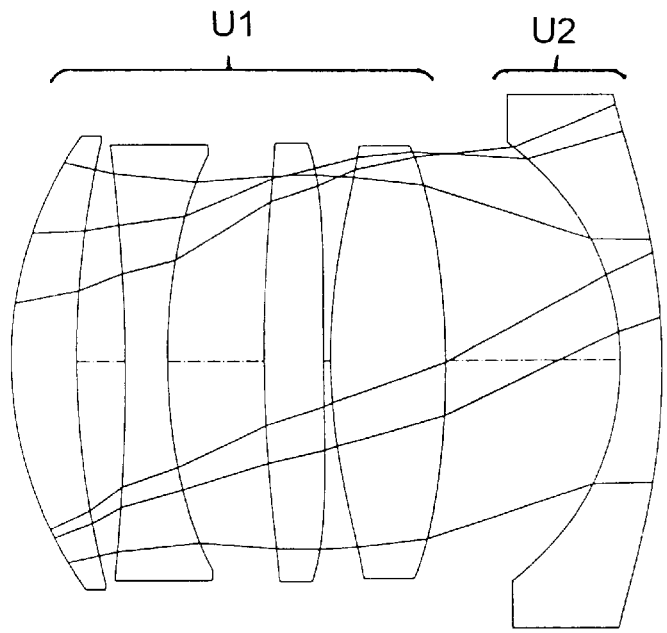
FIGS. 1A, 2A, and 3A are schematic side views of projection lenses constructed in accordance with the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention have the general form of a positive first lens unit and a negative second lens unit. Each of the two units includes at least one aspheric surface for use in aberration correction, including correction of spherical aberration, astigmatism, coma, and distortion. As discussed above, the system's distortion needs to be highly corrected for lens systems used with pixelized panels. The distortion correction is generally better than about one percent at the image, and preferably better than about 0.5 percent.

For purposes of color correction, the first lens unit includes a negative lens element composed of a high dispersion material and at least one positive lens element composed of a low dispersion material. The high and low dispersion materials can be glass or plastic.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For plastic lens elements, the high and low dispersion materials can be styrene and acrylic, respectively. Other plastics can, of course, be used if desired. For example, in place of styrene, polycarbonates and copolymers of polystyrene and acrylic (e.g., NAS) having flint-like dispersions can be used. See *The Handbook of Plastic Optics*, U.S. Precision Lens, Inc., Cincinnati, Ohio, 1983, pages 17–29.

As discussed above, the projection lenses of the invention are athermalized so that the optical performance of the system does not substantially change as the projection lens is heated from room temperature to its operating temperature. More specifically, the thermally-induced change in the modulation transfer function of the system at, for example, 5 cycles/millimeter, is preferably less than about 10%. The desired thermal stabilization is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction. If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by balancing positive and negative plastic optical power, while also taking into account both the location of the plastic lens elements and the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small, e.g., elements near the focus of the system, will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

Figure 1B:
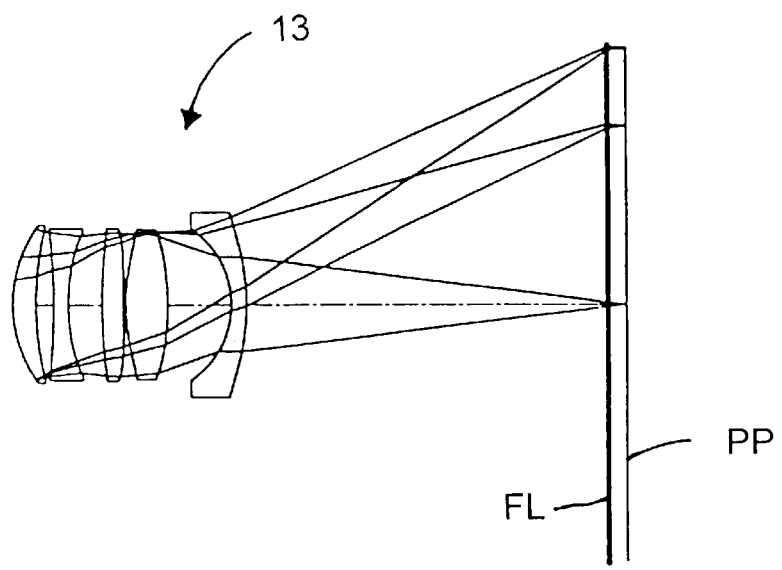
FIGS. 1B, 2B, and 3B show the projection lenses of FIGS. 1A, 2A, and 3A, respectively, in combination with a pixelized panel (PP) and a Fresnel lens (FL).
Figure 2A:
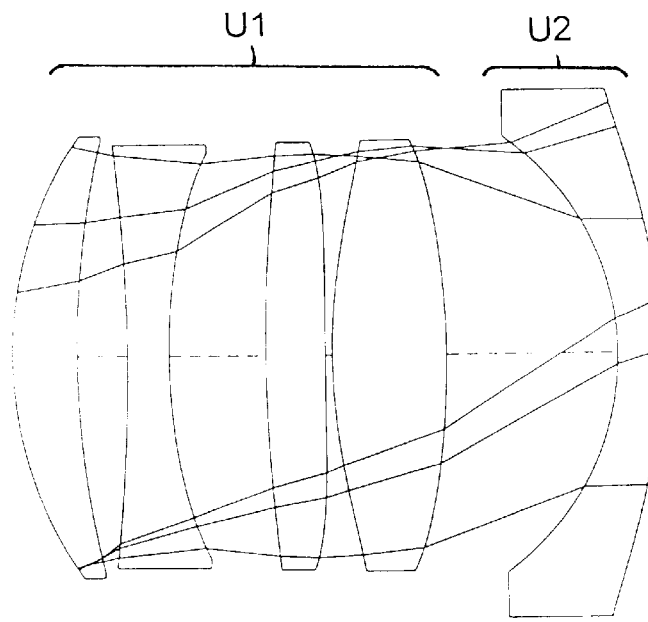
Figure 2B:
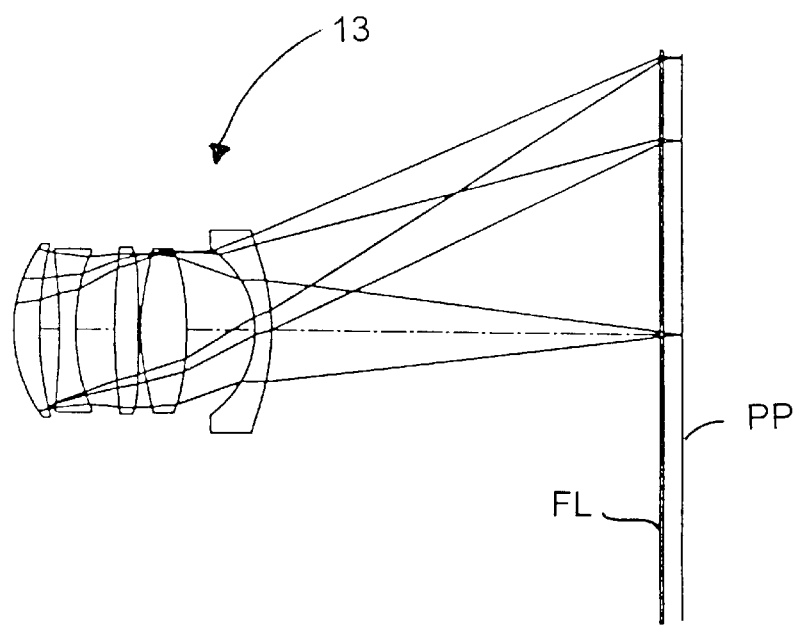
Figure 3A:
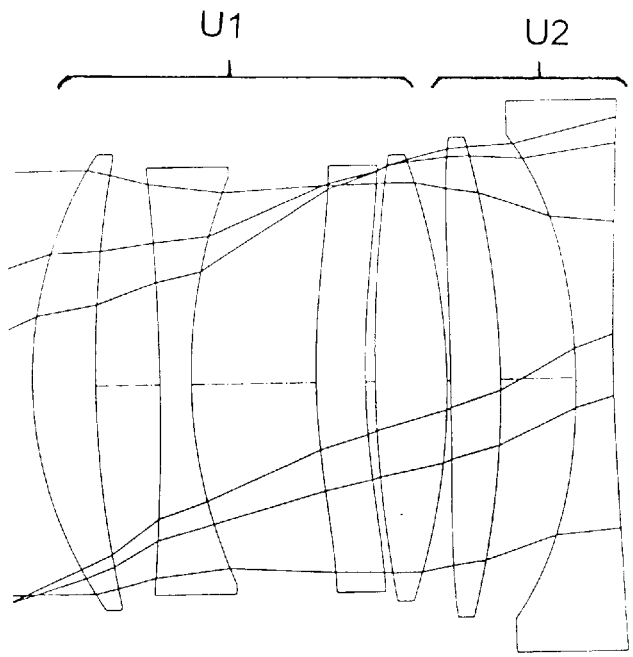

FIGS. 1 to 3 illustrate various projection lenses constructed in accordance with the invention. Corresponding prescriptions and optical properties appear in Tables 1 to 3, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1 + k)\ c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–3.

The abbreviations used in the tables are as follows:

| | |
|---|---|
| EFL | effective focal length |
| FVD | front vertex distance |
| f/ | f-number |
| ENP | entrance pupil as seen from the long conjugate |
| BRL | barrel length |
| OBJ HT | object height |
| MAG | magnification |
| STOP | location and size of aperture stop |
| IMD | image distance |
| OBD | object distance |
| OVL | overall length. |

Figure 3B:
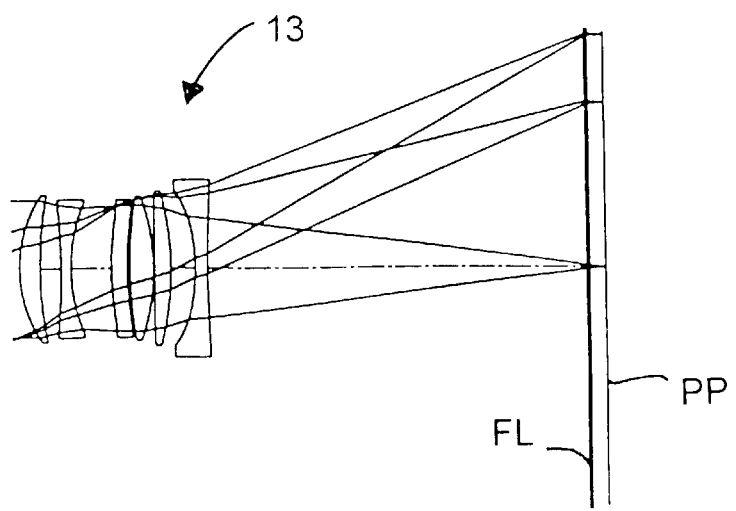
Figure 4:
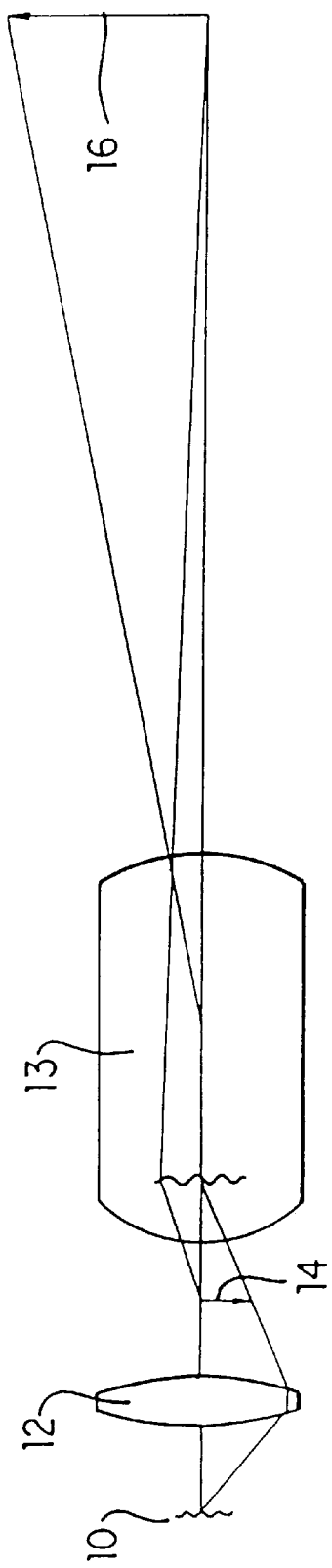
FIG. 4 is a schematic diagram showing an overall projection lens system in which the projection lens of the present invention can be used.

The values for these parameters reported in Tables 1–3 were calculated with the Fresnel lens as part of the system. The designation "a" associated with various surfaces in the tables represents an aspheric surface., i.e., a surface for which at least one of D, E, F, G, H, or I in the above equation is not zero. All dimensions given in the tables are in millimeters. The tables are constructed on the assumption that light travels from left to right in the figures. In actual practice, the viewing screen will be on the left and the pixelized panel will be on the right, and light will travel from right to left. The pixelized panel is shown in FIGS. 1B, 2B, and 3B by the designation "PP" and the Fresnel lens associated with the pixelized panel is shown by the designation "FL".

In Tables 1 and 2, the first lens unit (U1) comprises surfaces 1–8 and the second lens unit (U2) comprises surfaces 9–10. In Table 3, the first lens unit (U1) comprises surfaces 2–9 and the second lens unit (U2) comprises surfaces 10–13. Surface 1 in Table 3 is an optional vignetting surface.

As discussed above, the projection lenses of FIGS. 1–3 were designed using the pseudo-aperture stop/entrance pupil technique of Betensky, U.S. Pat. No. 5,313,330. In accordance with this approach, the illumination system is used to define the entrance pupil for the projection lens, with the entrance pupil being located at a constant position relative to the pixelized panel for all lens focal lengths and conjugates. The location of this pupil is determined by the substantially parallel light (substantially telecentric light) which passes through the pixelized panel from the illumination system and the Fresnel lens which is located at a fixed position on the projection lens side of the panel.

Surfaces 11 in Tables 1 and 2, and surface 14 in Table 3, constitute the pseudo-aperture stop of the above Betensky patent. Its location corresponds to the location of the output of the illumination system. As can be seen in the subtables labeled "Variable Spaces," the distance from the pseudo-aperture stop to the pixelized panel is essentially constant for all focal positions/zoom positions (magnifications) of the projection lens systems of FIGS. 1–3 (see the column labeled "Image Distance"). In contrast, "Space 2" changes for the different magnifications. For the focus positions shown, this space is negative corresponding to the illumination output being located within the space defined by the lens' front and back lens surfaces.

As also discussed above, the projection lenses of FIGS. 1–2 can be focused over a large conjugate range by varying the distance between the first and second lens elements of the first lens unit in conjunction with moving the entire lens relative to the pixelized panel. As shown in Tables 1–2, the amount of movement between these lens elements is small, e.g., less than about 1 millimeter.

For the lens system of FIG. 3, zooming is achieved by varying the distance between the first and second lens units, again in conjunction with the motion of the whole lens. As shown in Table 3, the movement of the first lens unit relative to the second lens unit is small compared to the overall movement of the lens system relative to the pixelized panel.

Table 4 summarizes various properties of the lens systems of the invention, where $P_0$ is the overall power of the lens system excluding the Fresnel lens, $P_{U1}$ is the power of the first lens unit and is positive in all cases, $P_{U2}$ is the power of the second lens unit and is negative in all cases, $P_{E3}$ is the power of the third lens element and is less than about 50 percent of $P_0$ in all cases, and $P_{E4}$ is the power of the fourth lens element and is greater than about 150 percent of $P_0$ in all cases. It should also be noted that a preferred value for the ratio of $P_{U1}/P_0$ is greater than about 1.3 and for the ratio of $|P_{U2}|/P_0$ is greater than about 0.6. As shown in Table 4, the lens systems of FIGS. 1–3 achieve these preferred ratios.

The lenses of FIGS. 1–3 were designed for use with LCD panels having a diagonal of about 10.6 inches (about 270 millimeters), which corresponds to an effective diagonal of approximately 12.2 inches (approximately 310 millimeters) when the offset of the panel from the lens system's optical axis is included. The panels have a pixel size of 200 microns, corresponding to over 1,000 TV lines of horizontal resolution. The images of the panels produced by the lenses of the invention typically range from about 60 inches (about 1,525 millimeters) to about 250 inches (about 6,350 millimeters). Significantly, the lenses achieve extremely good chromatic correction to the order of a quarter pixel (50 microns) or less. This is an extremely important feature for high quality data or video projection.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 |  | 80.2345 | 13.60000 | BACD18 | 91.61 |
| 2 |  | 189.5129 | Space 1 |  | 89.35 |
| 3 | a | −363.9135 | 8.71000 | STYRENE | 87.86 |
| 4 | ac | 128.5309 | 20.04798 |  | 83.57 |
| 5 | ac | 335.8461 | 12.44000 | ACRYLIC | 87.46 |
| 6 | a | 1374.9859 | 1.46824 |  | 88.46 |
| 7 | ac | 121.3770 | 24.04000 | ACRYLIC | 87.21 |
| 8 | a | −180.9905 | 36.06222 |  | 87.18 |
| 9 | a | −58.6444 | 8.71000 | ACRYLIC | 88.41 |
| 10 | a | −146.2454 | Space 2 |  | 105.89 |

TABLE 1-continued

| 11 | | Aperture stop | 278.00000 | | 72.07 |
|----|-----|---------------|-----------|---------|--------|
| 12 | | ∞ | 2.00000 | ACRYLIC | 303.99 |
| 13 | acf | −145.1760 | Image distance | | 305.15 |

Symbol Description a — Polynomial asphere
c — Conic section
f — Fresnel

Conics

| Surface Number | Constant |
|---|---|
| 4 | 5.0000E−01 |
| 5 | 2.0000E+01 |
| 7 | −1.8000E+00 |
| 13 | −1.0000E+00 |

Even Polynomial Aspheres

| Surf. No. | D | E | F | G | H | I |
|---|---|---|---|---|---|---|
| 3 | 2.5865E−08 | 4.6778E−11 | −3.2126E−14 | 6.7943E−18 | 2.2478E−21 | −1.0837E−24 |
| 4 | 1.8487E−07 | 8.5854E−11 | 1.5067E−14 | −1.0392E−17 | 1.2111E−20 | −2.3976E−24 |
| 5 | 2.5567E−08 | −5.6794E−11 | −1.0633E−14 | 1.2259E−18 | −1.8325E−22 | −9.9762E−25 |
| 6 | −5.0030E−07 | −1.5892E−10 | 4.7261E−15 | −3.4141E−18 | −1.1894E−21 | −2.7529E−26 |
| 7 | −2.4788E−07 | −3.3215E−11 | −1.5518E−14 | 1.6811E−18 | −5.1058E−22 | −1.1613E−24 |
| 8 | −1.4800E−07 | −5.8020E−11 | −6.5836E−15 | −8.4681E−18 | −1.9423E−21 | 1.6749E−26 |
| 9 | −6.3747E−07 | 6.9165E−11 | 2.5912E−14 | 1.5153E−17 | −1.5001E−20 | 3.9065E−24 |
| 10 | −2.7228E−07 | 1.7843E−10 | −1.2246E−14 | −1.7512E−18 | −2.1004E−23 | 5.3283E−26 |
| 13 | −3.5550E−09 | 1.5454E−14 | −4.2142E−20 | 0.0000E+00 | 0.0000E+00 | 0.0000E+00 |

Variable Spaces

| Focus Pos. | Space 1 T(2) | Space 2 T(10) | Focal Shift | Image Distance |
|---|---|---|---|---|
| 1 | 10.566 | −68.357 | −0.894 | 10.006 |
| 2 | 10.007 | −89.647 | −0.285 | 10.021 |
| 3 | 10.817 | −53.005 | −1.586 | 10.006 |

SYSTEM FIRST ORDER PROPERTIES, POS 1

| OBJ. HT: | −1370.0 | f/ | 3.93 | MAG: | −0.1100 |
|---|---|---|---|---|---|
| STOP: | 0.00 after surface 11. | DIA: | 71.702 | | |
| EFL: | 350.123 | FVD: | 357.293 | ENP: | 35.8909 |
| IMD: | 10.0058 | BRL: | 347.287 | | |
| OBD: | −3169.06 | OVL: | 3526.35 | | |

SYSTEM FIRST ORDER PROPERTIES, POS 2

| OBJ. HT: | −3750.0 | f/ | 3.93 | MAG: | −0.0400 |
|---|---|---|---|---|---|
| STOP: | 0.00 after surface 11. | DIA: | 71.734 | | |
| EFL: | 323.586 | FVD: | 335.459 | ENP: | 4.10812 |
| IMD: | 10.0205 | BRL: | 325.439 | | |
| OBD: | −8104.27 | OVL: | 8439.73 | | |

SYSTEM FIRST ORDER PROPERTIES, POS 3

| OBJ. HT: | −935.00 | f/ | 4.02 | MAG: | −0.1600 |
|---|---|---|---|---|---|
| STOP: | 0.00 after surface 11. | DIA: | 70.033 | | |
| EFL: | 371.879 | FVD: | 372.896 | ENP: | 62.2578 |
| IMD: | 10.0061 | BRL: | 362.890 | | |
| OBD: | −2286.90 | OVL: | 2659.80 | | |

First Order Properties of Elements

| Element Number | Surface Numbers | | Power | f' |
|---|---|---|---|---|
| 1 | 1 | 2 | 0.48329E−02 | 206.92 |
| 2 | 3 | 4 | −0.63050E−02 | −158.60 |
| 3 | 5 | 6 | 0.11155E−02 | 896.44 |
| 4 | 7 | 8 | 0.66177E−02 | 151.11 |
| 5 | 9 | 10 | −0.48777E−02 | −205.01 |
| 6 | 12 | 13 | 0.34012E−02 | 294.01 |

TABLE 2

| Surf. No. | Type | Radius | Thickness | Glass | Clear Aperture Diameter |
|---|---|---|---|---|---|
| 1 |  | 80.2345 | 13.60000 | BACD18 | 91.70 |
| 2 |  | 189.5129 | Space 1 |  | 89.40 |
| 3 | a | −350.9185 | 8.71000 | STYRENE | 86.28 |
| 4 | ac | 128.9831 | 20.50230 |  | 82.25 |
| 5 | ac | 335.8461 | 12.44000 | ACRYLIC | 87.50 |
| 6 | a | 1374.9859 | 1.46824 |  | 88.50 |
| 7 | ac | 121.3770 | 24.04000 | ACRYLIC | 87.30 |
| 8 | a | −180.9905 | 36.06000 |  | 87.20 |
| 9 | a | −57.9805 | 8.71000 | ACRYLIC | 88.84 |
| 10 | a | −136.8970 | Space 2 |  | 105.83 |
| 11 |  | Aperture stop | 278.00000 |  | 72.10 |
| 12 |  | ∞ | 2.00000 | ACRYLIC | 304.00 |
| 13 | acf | −145.1760 | Image distance |  | 305.20 |

Symbol Description a — Polynomial asphere
c — Conic section
f — Fresnel

Conics

| Surface Number | Constant |
|---|---|
| 4 | 5.0000E−01 |
| 5 | 2.0000E+01 |
| 7 | −1.8000E+00 |
| 13 | −1.0000E+00 |

Even Polynomial Aspheres

| Surf. No. | D | E | F | G | H | I |
|---|---|---|---|---|---|---|
| 3 | 1.7590E−08 | 5.0387E−11 | −3.3204E−14 | 7.6014E−18 | 2.2646E−21 | −1.2446E−24 |
| 4 | 1.6747E−07 | 8.4654E−11 | 1.7954E−14 | −1.0849E−17 | 1.2013E−20 | −2.5146E−24 |
| 5 | 2.5567E−08 | −5.6794E−11 | −1.0633E−14 | 1.2259E−18 | −1.8325E−22 | −9.9762E−25 |
| 6 | −5.0030E−07 | −1.5892E−10 | 4.7261E−15 | −3.4141E−18 | −1.1894E−21 | −2.7529E−26 |
| 7 | −2.4788E−07 | −3.3215E−11 | −1.5518E−14 | 1.6811E−18 | −5.1058E−22 | −1.1613E−24 |
| 8 | −1.4800E−07 | −5.8020E−11 | −6.5836E−15 | −8.4681E−18 | −1.9423E−21 | 1.6749E−26 |
| 9 | −7.1616E−07 | 5.7268E−11 | 5.0760E−14 | 1.3376E−17 | −1.6262E−20 | 4.2647E−24 |
| 10 | −3.6370E−07 | 1.9830E−10 | −1.0978E−14 | −1.4929E−18 | −2.8229E−22 | 7.7082E−26 |
| 13 | −3.5550E−09 | 1.5454E−14 | −4.2142E−20 | 0.0000E+00 | 0.0000E+00 | 0.0000E+00 |

Variable Spaces

| Focus Pos. | Space 1 T(2) | Space 2 T(10) | Focal Shift | Image Distance |
|---|---|---|---|---|
| 1 | 10.566 | −70.095 | −1.230 | 9.995 |
| 2 | 10.007 | −91.034 | −0.494 | 10.009 |
| 3 | 10.817 | −55.028 | −2.053 | 9.997 |

SYSTEM FIRST ORDER PROPERTIES, POS 1

OBJ. HT: −1370.0  f/ 3.93  MAG: −0.1100
STOP: 0.00 after surface 11.  DIA: 71.697
EFL: 344.980  FVD: 355.996  ENP: 34.9155
IMD: 9.99523  BRL: 346.001
OBD: −3122.63  OVL: 3478.62

SYSTEM FIRST ORDER PROPERTIES, POS 2

OBJ. HT: −3750.0  f/ 3.93  MAG: −0.0400
STOP: 0.00 after surface 11.  DIA: 71.735
EFL: 319.279  FVD: 334.513  ENP: 4.50331
IMD: 10.0094  BRL: 324.504
OBD: −7995.69  OVL: 8330.21

SYSTEM FIRST ORDER PROPERTIES, POS 3

OBJ. HT: −935.00  f/ 4.02  MAG: −0.1600
STOP: 0.00 after surface 11.  DIA: 70.028
EFL: 365.941  FVD: 371.317  ENP: 60.0103
IMD: 9.99720  BRL: 361.319
OBD: −2251.24  OVL: 2622.56

TABLE 2-continued

First Order Properties of Elements

| Element Number | Surface Numbers | Power | f' |
|---|---|---|---|
| 1 | 1 2 | 0.48329E−02 | 206.92 |
| 2 | 3 4 | −0.63507E−02 | −157.46 |
| 3 | 5 6 | 0.11155E−02 | 896.44 |
| 4 | 7 8 | 0.66177E−02 | 151.11 |
| 5 | 9 10 | −0.47302E−02 | −211.41 |
| 6 | 12 13 | 0.34012E−02 | 294.01 |

TABLE 3

| Surf. No. | Type | Radius | Thickness | Glass | Clear Aperture Diameter |
|---|---|---|---|---|---|
| 1 |  | ∞ | 5.00000 |  | 90.50 |
| 2 |  | 83.1719 | 13.00000 | BACED5 | 91.00 |
| 3 |  | 233.9264 | 13.33000 |  | 89.11 |
| 4 |  | −485.5457 | 6.47000 | FD2 | 85.22 |
| 5 |  | 105.3363 | 25.75000 |  | 81.16 |
| 6 | a | 154.1888 | 10.00000 | ACRYLIC | 83.92 |
| 7 | a | 174.3731 | 2.00000 |  | 85.20 |
| 8 |  | 284.2298 | 14.70000 | BACD5 | 87.00 |
| 9 |  | −139.0179 | Space 1 |  | 89.10 |
| 10 | a | −585.4332 | 11.69000 | ACRYLIC | 95.00 |
| 11 |  | −164.0203 | 15.47000 |  | 95.50 |
| 12 | a | −131.3993 | 7.79000 | ACRYLIC | 96.00 |
| 13 | a | 452.6431 | Space 2 |  | 108.00 |
| 14 |  | Aperture stop | 321.37000 |  | 82.70 |
| 15 |  | ∞ | 2.00000 | ACRYLIC | 304.00 |
| 16 | acf | −145.1760 | Image distance |  | 304.00 |

Symbol Description a — Polynomial asphere
c — Conic section
f — Fresnel

Conics

| Surface Number | Constant |
|---|---|
| 16 | −1.0000E+00 |

Even Polynomial Aspheres

| Surf. No. | D | E | F | G | H | I |
|---|---|---|---|---|---|---|
| 6 | −7.0450E−07 | −1.4118E−11 | −4.6437E−14 | 2.0991E−17 | −8.3654E−21 | 1.8668E−24 |
| 7 | −5.8899E−07 | 1.3633E−12 | 5.5836E−14 | −8.2367E−17 | 3.4781E−20 | −4.8293E−24 |
| 10 | −4.2671E−08 | 2.3388E−10 | −1.2627E−13 | 6.6272E−17 | −2.3640E−20 | 3.6813E−24 |
| 12 | −5.3253E−07 | −1.0642E−10 | 3.9159E−14 | −9.0601E−18 | 6.1443E−21 | −1.7273E−24 |
| 13 | −4.8337E−07 | 1.0322E−10 | −3.0287E−14 | 1.7560E−17 | −4.5633E−21 | 3.8509E−25 |
| 16 | −2.9975E−09 | 1.1630E−14 | −2.8304E−20 | 0.0000E+00 | 0.0000E+00 | 0.0000E+00 |

Variable Spaces

| Focus Pos. | Space 1 T(9) | Space 2 T(13) | Focal Shift | Image Distance |
|---|---|---|---|---|
| 1 | 5.227 | −69.256 | −1.432 | 9.957 |
| 2 | 5.227 | −92.613 | −0.642 | 9.990 |
| 3 | 5.227 | −52.312 | −1.787 | 9.935 |
| 4 | 14.700 | −116.470 | −1.285 | 9.997 |
| 5 | 0.777 | −80.140 | 0.265 | 9.993 |

SYSTEM FIRST ORDER PROPERTIES, POS 1
POS 1 System First Order Properties

| OBJ. HT: | −1360.0 | f/ | 3.93 | MAG: | −0.1100 |
| STOP: | 0.00 after surface 14. | DIA: | 82.432 | | |
| EFL: | 363.715 | FVD: | 394.498 | ENP: | 37.2564 |

TABLE 3-continued

| IMD: | 9.95692 | BRL: | 384.541 |
| OBD: | −3229.58 | OVL: | 3624.07 |

SYSTEM FIRST ORDER PROPERTIES, POS 2

| OBJ. HT: | −3750.0 | f/ | 3.93 | MAG: | −0.0400 |
| STOP: | 0.00 after surface 14. | DIA: | 82.572 | | |
| EFL: | 334.551 | FVD: | 371.174 | ENP: | 10.2225 |
| IMD: | 9.98978 | BRL: | 361.184 | | |
| OBD: | −8319.72 | OVL: | 8690.90 | | |

SYSTEM FIRST ORDER PROPERTIES, POS 3

| OBJ. HT: | −935.00 | f/ | 4.15 | MAG: | −0.1600 |
| STOP: | 0.00 after surface 14. | DIA: | 77.947 | | |
| EFL: | 388.269 | FVD: | 411.420 | ENP: | 59.6933 |
| IMD: | 9.93544 | BRL: | 401.484 | | |
| OBD: | −2322.07 | OVL: | 2733.49 | | |

SYSTEM FIRST ORDER PROPERTIES, POS 4

| OBJ. HT: | −3901.0 | f/ | 3.93 | MAG: | −0.0384 |
| STOP: | 0.00 after surface 14. | DIA: | 82.662 | | |
| EFL: | 320.597 | FVD: | 356.797 | ENP: | −9.34592 |
| IMD: | 9.99721 | BRL: | 346.800 | | |
| OBD: | −8331.49 | OVL: | 8688.29 | | |

SYSTEM FIRST ORDER PROPERTIES, POS 5

| OBJ. HT: | −3672.0 | f/ | 3.93 | MAG: | −0.0409 |
| STOP: | 0.00 after surface 14. | DIA: | 82.524 | | |
| EFL: | 342.287 | FVD: | 379.200 | ENP: | 21.0808 |
| IMD: | 9.99287 | BRL: | 369.207 | | |
| OBD: | −8312.39 | OVL: | 8691.59 | | |

First Order Properties of Elements

| Element Number | Surface Numbers | Power | f |
| --- | --- | --- | --- |
| 1 | 2  3 | 0.53017E−02 | 188.62 |
| 2 | 4  5 | −0.75677E−02 | −132.14 |
| 3 | 6  7 | 0.43140E−03 | 2318.0 |
| 4 | 8  9 | 0.62533E−02 | 159.92 |
| 5 | 10 11 | 0.21869E−02 | 457.27 |
| 6 | 12 13 | −0.48701E−02 | −205.34 |
| 7 | 15 16 | 0.34012E−02 | 294.01 |

TABLE 4

| FIG. | $P_O$ | $P_{U1}$ | $P_{U2}$ | $P_{E3}$ | $P_{E4}$ |
| --- | --- | --- | --- | --- | --- |
| 1 | 0.0031 | 0.0061 | −0.0049 | 0.0011 | 0.0066 |
| 2 | 0.0032 | 0.0061 | −0.0047 | 0.0011 | 0.0066 |
| 3 | 0.0030 | 0.0047 | −0.0025 | 0.0004 | 0.0063 |

What is claimed is:

1. A projection lens for forming an image of an object, said lens consisting in order from its image end to its object end of:
   (A) a first lens unit having a positive power and comprising in order from the image side to the object side:
      (i) a positive lens element;
      (ii) a negative lens element;
      (iii) a lens element of weak optical power; and
      (iv) a positive lens element of strong optical power; and
   (B) a second lens unit having a negative power; wherein:
      (a) the first lens unit and the second lens unit have a combined optical power $P_O$;
      (b) the positive lens element of strong optical power has a power $P_{E4}$; and
   (C) $P_{E4} > 1.5 \cdot P_O$.

2. A projection lens system for forming an image of an object, said system comprising:
   (a) an illumination system comprising a light source and illumination optics which forms an image of the light source, said image of the light source being the output of the illumination system;
   (b) a pixelized panel which comprises the object; and
   (c) a projection lens which forms the image of the object, said lens comprising in order from its image end to its object end:
      (A) a first lens unit having a positive power and comprising in order from the image side to the object side:
         (i) a positive lens element;
         (ii) a negative lens element;
         (iii) a lens element of weak optical power; and
         (iv) a positive lens element of strong optical power; and
      (B) a second lens unit having a negative power.

3. The projection lens system of claim 2 wherein said projection lens has an entrance pupil whose location substantially corresponds to the location of the output of the illumination system.

4. The projection lens system of claim 2 further comprising a field lens between the pixelized panel and the projection lens.

5. A projection lens for forming an image of an object, said lens consisting in order from its image end to its object end of:
   (A) a first lens unit having a positive power and comprising in order from the image side to the object side:

(i) a positive lens element;
(ii) a negative lens element;
(iii) a lens element of weak optical power; and
(iv) a positive lens element of strong optical power; and (B) a second lens unit having a negative power;

wherein the lens has a distortion which is less than about one percent at the image.

6. A projection lens for forming an image of an object, said lens consisting in order from its image end to its object end of:

(A) a first lens unit having a positive power and consisting in order from the image side to the object side of:
(i) a positive lens element;
(ii) a negative lens element;
(iii) a lens element of weak optical power; and
(iv) a positive lens element of strong optical power; and (B) a second lens unit having a negative power.

7. The projection lens of claim 1, 5, or 6 wherein the negative lens element of the first lens unit is composed of a high dispersion material.

8. The projection lens of claim 1, 5, or 6 wherein the second lens unit is a singlet.

9. The projection lens of claim 1, 5, or 6 wherein the second lens unit comprises two lens elements, one having a positive power and the other a negative power.

10. The projection lens of claim 1, 5, or 6 wherein each of the first and second lens units comprises at least one aspheric surface.

11. The projection lens of claim 1, 5, or 6 wherein the modulation transfer function of the lens at 5 cycles/millimeter changes less than about ten percent as the lens is heated from room temperature to its operating temperature.

12. The projection lens of claim 1 or 6 wherein the lens has a distortion which is less than about one percent at the image.

13. The projection lens of claim 1, 5, or 6 wherein the object is a pixelized panel.

14. The projection lens of claim 13 wherein the projection lens has a lateral color aberration which is less than about a pixel at the object.

15. A projection lens system for forming an image of an object, said system comprising:

(a) an illumination system comprising a light source and illumination optics which forms an image of the light source, said image of the light source being the output of the illumination system;

(b) a pixelized panel which comprises the object; and (c) the projection lens of claim 1, 5, or 6.

16. The projection lens system of claim 15 wherein said projection lens has an entrance pupil whose location substantially corresponds to the location of the output of the illumination system.

17. The projection lens system of claim 15 further comprising a field lens between the pixelized panel and the projection lens.

18. The projection lens of claim 6 wherein the lens has a distortion which is less than about one percent at the image.

19. A projection lens system for forming an image of an object, said system comprising:

(a) an illumination system comprising a light source and illumination optics which forms an image of the light source, said image of the light source being the output of the illumination system;

(b) a pixelized panel which comprises the object; and (c) a projection lens which forms the image of the object, said lens consisting in order from its image end to its object end of:

(A) a first lens unit having a positive power and comprising in order from the image side to the object side:
(i) a positive lens element;
(ii) a negative lens element;
(iii) a lens element of weak optical power; and
(iv) a positive lens element of strong optical power; and (B) a second lens unit having a negative power.

20. The projection lens system of claim 19 further comprising a field lens between the pixelized panel and the projection lens.

21. The projection lens system of claim 19 wherein said projection lens has an entrance pupil whose location substantially corresponds to the location of the output of the illumination system.

* * * * *